(12) United States Patent
Rattunde (10) Patent No.: US 11,179,786 B2
(45) Date of Patent: Nov. 23, 2021

(54) ECCENTRIC CUTTING DRIVE HAVING A VARIABLE STROKE

(71) Applicant: Rattunde AG, Ludwigslust (DE)

(72) Inventor: Ulrich Rattunde, Ludwigslust (DE)

(73) Assignee: Rattunde AG, Ludwigslust (DE)

( * ) Notice: Subject to any disclaimer, the term of this patent is extended or adjusted under 35 U.S.C. 154(b) by 0 days.

(21) Appl. No.: 16/335,711

(22) PCT Filed: Sep. 11, 2017

(86) PCT No.: PCT/EP2017/072697
§ 371 (c)(1),
(2) Date: Mar. 22, 2019

(87) PCT Pub. No.: WO2018/054706
PCT Pub. Date: Mar. 29, 2018

(65) Prior Publication Data
US 2019/0321899 A1 Oct. 24, 2019

(30) Foreign Application Priority Data
Sep. 23, 2016 (DE) ..................... 10 2016 117 956.6

(51) Int. Cl.
| | | |
|---|---|---|
| *B23D 23/04* | (2006.01) | |
| *B26D 3/16* | (2006.01) | |
| *B23D 21/14* | (2006.01) | |
| *B23D 35/00* | (2006.01) | |
| *B26D 5/14* | (2006.01) | |

(52) U.S. Cl.
CPC .............. *B23D 23/04* (2013.01); *B26D 3/16* (2013.01); *B23D 21/14* (2013.01); *B23D 35/001* (2013.01); *B23D 35/007* (2013.01); *B26D 5/14* (2013.01)

(58) Field of Classification Search
CPC ........ B23D 21/00; B23D 21/14; B23D 23/04; B23D 35/001; B23D 35/007; B26D 1/43; B26D 1/45; B26D 3/16; B26D 3/164; B26D 5/14
See application file for complete search history.

(56) References Cited

U.S. PATENT DOCUMENTS

| | | | |
|---|---|---|---|
| 2,526,163 A | 10/1950 | Shippy et al. | |
| 3,494,233 A | 2/1970 | Kojima | |
| 4,794,834 A * | 1/1989 | Werner | ................. B23D 21/14 81/185 |
| 6,352,012 B1 | 3/2002 | Borzym | |
| 2009/0083983 A1 | 4/2009 | Takasuga | |
| 2010/0199821 A1* | 8/2010 | Kawakami | ............. B23D 21/14 83/54 |
| 2012/0011976 A1 | 1/2012 | Kawakami | |

FOREIGN PATENT DOCUMENTS

| | | |
|---|---|---|
| DE | 17 52 288 B | 7/1971 |
| FR | 2 557 823 A1 | 7/1985 |
| JP | S52 14990 A | 2/1977 |

* cited by examiner

*Primary Examiner* — Stephen Choi
(74) *Attorney, Agent, or Firm* — Bay State IP, LLC (57) ABSTRACT

A pipe cutting machine, which includes a hole-type movable cutting die (6b), which is driven by a drive lever (7), by means of which circular movements with a continuously variable stroke (h) can be performed, an eccentrically shaped crank pin bearing (26) in an outer shaft (18), in which a crank pin (11), which is arranged eccentrically on a crank pin drive (23), is movably supported in relation to the outer shaft (18), the crank pin (11) being in operative connection with the drive lever (7).

9 Claims, 8 Drawing Sheets

ECCENTRIC CUTTING DRIVE HAVING A VARIABLE STROKE

CROSS REFERENCE TO RELATED APPLICATION

This application is for entry into the U.S. National Phase under § 371 for International Application No. PCT/EP2017/072697 having an international filing date of Sep. 11, 2017, and from which priority is claimed under all applicable sections of Title 35 of the United States Code including, but not limited to, Sections 120, 363, and 365(c), and which in turn claims priority under 35 USC 119 to German Patent Application No. 10 2016 117 956.6 filed on Sep. 23, 2016.

The invention relates to a cutting device of a pipe cutting machine and a method for cutting a profiled section from a longitudinal profiled member Naturally, cutting devices for pipe cutting machines are well known in the prior art.

In the known cutting devices a hole-type cutting die is provided which is connected to two actuating drives. The two actuating drives act perpendicularly relative to one another and drive the cutting die successively to a vertical and a horizontal stroke movement. A pipe inserted into the cutting die is severed by the two sequential stroke movements. For this purpose it is necessary that one pipe section is held in a fixed position and the cutting die performs the two stroke movements perpendicularly to one another relative to the firmly held pipe section. A disadvantage of the cutting device having two stroke movements is that the pipe wall lying tangentially relative to the direction of movement is not cut with the first stroke, but is merely deformed. The deformed pipe wall is then cut by the second stroke. As a result, disadvantageous deformations of the pipe wall occur in the deflected pipe sections.

Therefore it is an object of the present invention to provide a cutting machine which avoids or at least reduces the above-mentioned disadvantages.

It is also an object of the present invention to provide a method for cutting a pipe section from a pipe, by which the above-mentioned disadvantages can be avoided or at least reduced.

In a first aspect the object is achieved by a cutting device of a pipe cutting machine with the features of claim 1.

The cutting device according to the invention comprises a hole-type, moving cutting die, which can be driven by means of a drive lever and performs circular movements with a continuously variable stroke. By a superimposition of the circular movement with a stroke change the cutting die can also perform an advantageous spiral or helical movement in the area where the stroke becomes greater. In this case the stroke is the radial distance of the crank pin from a centre line of the system which corresponds to the centre line of an inner shaft.

The cutting device comprises an eccentrically shaped bearing in an outer shaft, in which bearing an eccentrically shaped crank pin drive is supported so as to be movable relative to the outer shaft. The crank pin drive is operatively connected to the drive lever and a circular movement of the crank pin drive generates a circular movement of the crank pin.

A relative rotation of the crank pin drive and the outer shaft change the stroke. In the event of continuous rotation the change advantageously likewise takes place continuously.

The cutting device is preferably part of a cutting machine, preferably a pipe cutting machine.

The invention makes use of the idea of first of all providing a bearing in an outer shaft, wherein the bearing is not, however, concentric with the outer wall of the outer shaft, but is arranged eccentrically therein. By a rotation of the outer shaft the bearing performs an eccentric movement. The eccentricity of the bearing is predetermined.

The crank pin drive is movably supported in the eccentrically shaped bearing, wherein the crank pin drive itself has a crank pin arranged eccentrically on it. The eccentricity of the crank pin on the crank pin drive corresponds to the eccentricity of the bearing of the outer shaft. Both eccentricities are preferably the same.

The crank pin is operatively connected to the drive lever and drives drivable cutting die by means of the drive lever. A crank pin should be understood here for example as a pin projecting from the crank pin drive, but in this case it can also be a produced in the crank pin drive. Here "crank pin" merely means a mechanically connection between the crank pin drive and the drive lever. The crank pin is rotatably supported relative to the drive lever, in this case preferably a connection in the form of a pin and a matching hole, wherein the pin and the hole can be arranged on the drive lever and the crank pin drive or vice versa.

The cutting die cuts into the outer wall of the longitudinal profiled section and severs a profiled section. A longitudinal profiled section and the section thereof can be understood to be solid profiled sections, but in particular also pipes. Their external cross-section is preferably circular.

According to the invention two components are provided with eccentricities, wherein both eccentricities are designed to be the same. In one possible position the two eccentricities cancel one another out, so that when the cutting device is actuated the crank pin merely performs a rotary movement about its own centre line. In this case this involves the so-called zero stroke position, whilst in another position the eccentricities add up and when the cutting device is in operation the crank pin performs a rotational movement around the centre line of the system. This is the so-called maximum stroke position. The stroke of the crank pin can be continuously varied between the zero stroke position and the maximum stroke position.

A centre line of the crank pin drive and a centre line the outer shaft as well as a centre line of an inner shaft are preferably in pairs parallel to one another. With its centre line the inner shaft preferably defines the centre line of the entire system. The inner shaft advantageously drives the crank pin drive by means of a gear, and for this purpose the crank pin drive has an internal toothing with which an external toothing of the inner shaft meshes.

In a preferred embodiment of the invention the inner shaft is passed through a tubular section, which is small in diameter, of the outer shaft. The inner shaft can be supported in inner bearings of the outer shaft and can be designed to be movable relative thereto. Thus the inner shaft and the outer shaft can each be provided on the end remote from the crank pin drive with a respective drive gear which is operatively connected to a respective drive. The two drive gears are preferably arranged one immediately behind the other around the same axis of rotation.

The inner shaft is preferably driven by a first motor, preferably a servomotor, and the outer shaft is driven by a second motor, preferably a servomotor.

The centre line of the crank pin drive and the centre line of the outer shaft are preferably are arranged eccentrically relative to one another in any possible relative position of the crank pin drive and the outer shaft. The centre line of the crank pin of the crank pin drive and the centre line of the outer shaft are in a zero stroke position relative to one another.

Particularly preferably, a variable-stroke circular movement of the crank pin can be set by a speed differential of the first and second motors.

A speed differential leads to a continuous variation of the stroke of the crank pin. If a speed differential persists, the stroke also changes continuously between 0 and a maximum according to a sine function.

The same speed of both motors means that the currently set crank pin stroke no longer changes. As a rule, however, it is not zero, but a different currently set value. The speeds of both motors are transmitted in the same way to the inner or outer shaft. They can be transmitted without gearing or with the same gearing.

The setting of the crank pin stroke preferably takes place only by means of the angular position differential between the first motor, preferably a servomotor, and the second motor, preferably a servomotor, wherein both motors are referenced so that with a crank pin stroke of zero both drives acquire the same angle.

This results for example in the following relationships:

Motor 1=55° and motor 2=55°→angular position differential 0°→crank pin stroke=0

Motor 1=155° and motor 2=155°→angular position differential 0°→crank pin stroke=0

Motor 1=111° and motor 2=111°→angular position differential 0°→crank pin stroke=0

Motor 1=55° and motor 2=65°→angular position differential 10°→crank pin stroke>0 (=XX)

Motor 1=155° and motor 2=165°→angular position differential 10°→crank pin stroke>0(=XX)

Motor 1=55° and motor 2=75°→angular position differential 20°→crank pin stroke>XX The crank pin stroke is therefore a function of the angular position differential between the first and second motor.

The cutting device advantageously has a cutting mandrel which can be introduced into the pipe with a section which is stationary relative to the pipe cutting machine and a section which is movable relative thereto. The cutting mandrel is intended to transmit the cutting force during the cutting operation from one pipe wall to the opposing pipe wall and to counteract a deformation of the pipe. In the case of solid profiled sections no cutting mandrel is necessary.

With regard to the method the object of the invention is achieved by an above-mentioned method.

According to the invention a cutting die of a cutting device is set to a zero stroke position, that is to say the angular position differential between the first and the second motor is zero. Then a longitudinal profiled section is inserted into the cutting die, an inner shaft and an outer shaft are operated at the same rotational speed and with synchronised angular position; then a speed differential between the inner shaft and the outer shaft is set, and as a result a continuous shifting of the angular position between the motors is produced which is proportional to the crank pin stroke, so that a position of the crank pin is rotated out of a centre line of the outer shaft in a spiral movement. By means of a drive lever the crank pin drives the cutting die in a spiral movement which cuts a pipe section by a spiral movement of the pipe.

The speeds and thus the angular position differential between the first and the second motor are preferably varied. As a result the stroke is varied. With a constant speed differential and thus a constant angular position differential of the motor the stroke is varied sinusoidally over time. As a result the cutting die performs a spiral movement from a centre of the spiral to an outer spiral with an increasing diameter.

However, other cutting movements are also possible, such as for example:
  revolving spiral movement with differing pitch during the cutting process,
  revolving spiral movement with constant pitch during the cutting process,
  standing cutting movement vertically and horizontally separated (this cutting variant is produced when in each case only one motor performs a change of angular position and the other motor is stationary and
  combinations between the aforementioned variants.

The pitches can be achieved by changing of the speed differential.

The invention is described with reference to an embodiment in ten figures. In the drawings.

Figure 1:
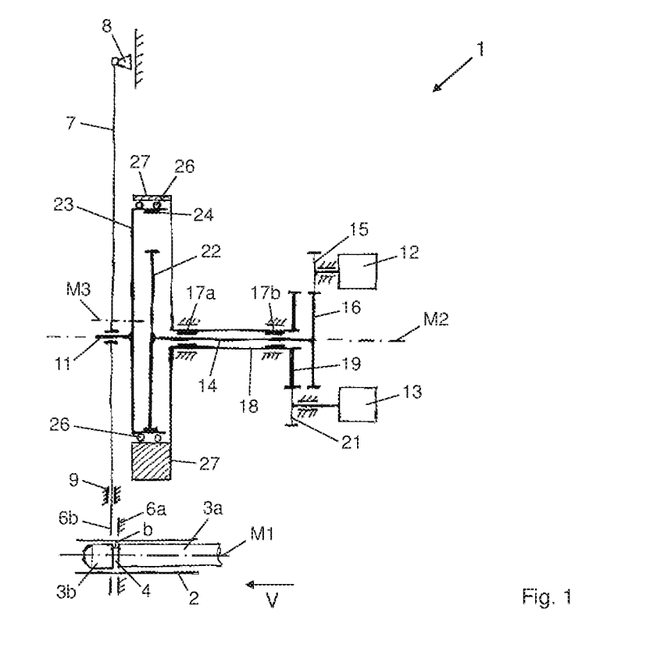
FIG. 1 shows a sectional view of the functional principle a cutting device according to the invention of a pipe cutting machine in a zero stroke position.

The functional principle illustrated in FIG. 1 shows the mode of operation of a cutting device 1 according to the invention of a pipe cutting machine. The pipe 2 to be cut is shown in the lower region. A two-part cutting mandrel 3a, 3b, which has a somewhat smaller external diameter than an internal diameter of the pipe 2 to be cut, is introduced into the pipe 2, so that the cutting mandrel 3a, 3b can be pushed to and fro without jamming in the pipe 2. The cutting mandrel 3a, 3b has a stationary part 3a and a movable part 3b, during the cutting off of a pipe section 2a from the pipe 2 the stationary part 3a remains in a fixed position relative to the housing and to the entire support structure of the pipe cutting machine, whilst the movable part 3b is movable relative to the stationary part 3a and is spaced apart from the stationary part 3a with a peripheral gap width of approximately b=0.1 mm, whilst the movable part 3b is supported approximately centrally on the stationary part along a cutting mandrel central axis M1. The support is not shown in detail here. Aligned with the gap 4 of the cutting mandrel 3a, 3b is a gap, which is preferably the same width, between a stationary cutting die 6a and a drivable cutting die 6b. The pipe piece 2a is cut off from the pipe 2 by an increasingly large helical circling movement of the drivable cutting matrix 6b relative to the stationary cutting die 6a. The cutting mandrel 3a, 3b counteracts a distortion of a pipe wall of the pipe 2, the cutting mandrel 3a, 3b, in particular the movable part 3b of the cutting mandrel 3a, 3b, transmits the forces radially through the pipe section 2a to be cut and onto the opposing pipe wall.

The drivable cutting die 6*b* is designed as a circular hole which has a sharp hole edge and is arranged on a drive lever 7. The drive lever 7 is supported in a pivot bearing 8 with a vertical guide, an axial guide 9 for the drive lever 7 is provided at a small distance from the cutting die 6*a*, 6*b* and prevents pivoting out of the drive lever 7 in the pushing direction V of the pipe 2.

The drive lever 7 is driven by means of a crank pin 11 for the helical movement according to the invention.

In this case the helical movement is generated by two superimposed movements which are generated respectively by a servomotor 12, 13. Each of the two servomotors 12, 13 runs at a rotational speed of 5000-6000 r.p.m.

A first servomotor 12 drives an inner shaft 14 by means of a gear transmission, and for this purpose a first drive gear 16 is provided at one end of the inner shaft 14 and interacts with a first pinion 15 which is driven by the first servomotor 12. The inner shaft 14 is supported in two inner bearings 17*a*, 17*b*, the inner bearings 17*a*, 17*b* being provided internally in an outer shaft 18.

The outer shaft 18 in turn is driven by the second servomotor 13 by means of a transmission comprising a second drive gear 19 and a second pinion 21. At the other end of the inner shaft 14 a gear 22 of an inner shaft 14 for a crank pin drive 23 is provided. The gear 22 having an external toothing on the inner shaft 14 meshes with an internal toothing 24 on the crank pin drive 23. The outer shaft 18 widens abruptly towards the drive lever 7. On the widened section it has a crank pin bearing 26 for the crank pin drive 23, but for outer periphery 27 is arranged eccentrically relative to the outer shaft 18. The eccentricity ε is illustrated by the different wall thickness of the outer shaft 18 in the section of the crank pin bearing 26. The crank pin bearing 26 is likewise provided with the eccentricity ε relative to the outer periphery. The external toothing of the inner shaft 14 meshes with the internal toothing 24 of the crank pin drive 23 at the point at which the wall thickness of the outer shaft in the widened section is greatest, this being the case in FIG. 1 at the bottom.

A centre line M2, which runs centrally through the inner shaft 14 and the gear 22 of the inner shaft 14 is a line of rotational symmetry of the inner shaft 14 and of the gear 22 of the inner shaft 14. However, the crank pin bearing 26 of the outer shaft 18 is arranged eccentrically relative to the centre line M2 of the inner shaft 14. The centre line M2 of the inner shaft 14 coincides with a centre line M2 of the outer shaft 18. Furthermore, the crank pin drive 23, which is depicted here as a bowl or lid, is provided with the crank pin 11, wherein the crank pin 11 in turn is arranged eccentrically relative to a centre line M3 of the crank pin drive 23. In this case the eccentricity ε of the crank pin drive 23 corresponds to the eccentricity ε of the outer shaft 18, so that in a corresponding position, as illustrated in FIG. 1, the eccentricities e cancel each other out and the crank pin 11 is arranged on the centre line M2 of the inner shaft 14. When the first and the second servomotor 12, 13 run at an identical rotational speed, the outer shaft 18 and the inner shaft 14 rotate without relative movement, so that the relative position which is illustrated in FIG. 1 is also maintained in the event of rotary movement, that is to say the crank pin 11 is always arranged on the centre line M2 of the system, that is to say the centre line M2 of the inner shaft 14, and performs a rotary movement with the rotational speed of the servomotors 12, 13.

A stroke h of the cutting device 1 is zero in the state according to FIG. 1; that is to say, in particular, that the drivable cutting die 6*b* does not perform any movement. In this position the pipe 2 can be introduced into the cutting die 6*a*, 6*b*.

Figure 2:
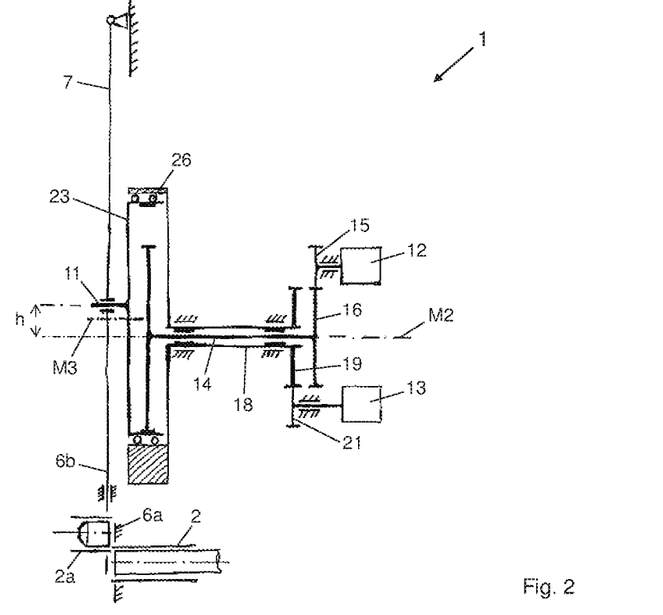
FIG. 2 shows a sectional view according to FIG. 1 in a maximum stroke position.

FIG. 2 shows a position of the cutting arrangement with a maximum stroke h. The state according to FIG. 2 is reached by the outer shaft 18 being stationary or running at a low rotational speed and the inner shaft 14 being driven or running at a higher rotational speed than the outer shaft 18; the crank pin drive 23 rotates in the crank pin bearing 26 due to the different rotational speed of the outer shaft 18 and the inner shaft 14. The speed differential leads to a continuous variation of the angular position between the first and second servomotor 12, 13. The stroke performs a sinusoidal movement. After a half revolution or a 180° rotation of the crank pin drive, the crank pin 11 reaches the position according to FIG. 2. The crank pin 11 rotates around the centre line M3 of the crank pin drive 23, which is arranged offset relative to the centre line M2 of the inner shaft 14 and is arranged parallel thereto.

In particular, by setting a speed differential of the crank pin drive 23 relative to the outer shaft 18 a continuous variation of the stroke h of the crank pin 11, i.e. the distance of the crank pin 11 from the centre line M2 of the system, i.e. the centre line M2 of the inner shaft 14, can be set. In FIG. 2 the maximum stroke h is set, and the eccentricity ε of the crank pin drive 23 and the eccentricity ε of the outer shaft 18 must correspond, so that a zero stroke position according to FIG. 1 can be set. When a specific stroke h is reached, the speed differential, that is to say the angular position differential, is kept at the set value. The stroke h then remains constant at the set value. Depending upon the magnitude of the speed differential, the frequency of the sinusoidal movement of the stroke h changes.

In the maximum stroke position according to FIG. 2, the drivable cutting die 6*b* has a position which is shifted relative to the stationary cutting die 6*a*, so that the pipe section 2*a* is cut off from the pipe 2 or is cut into. If the maximum stroke is to be maintained, the rotational speed of both servomotors 12, 13 is set to be the same.

In the maximum stroke position illustrated in FIG. 2, with subsequent synchronisation of the rotational speeds of the first and second servomotor 12, 13, the crank pin 11 is driven to perform a purely rotational movement around the centre line M3 of the crank pin drive 23, which leads to a circular movement of the drivable cutting die 6*b*. The stroke of the crank pin 11 from the centre line M2 of the inner shaft 14 is continuously adjustable. By the setting of a speed differential between the outer and inner shafts 18, 14, first of all a continuous distancing of the crank pin 11 from the centre line M2 of the inner shaft 14 can be achieved, and then an approach of the crank pin 11 to the centre line M2 of the inner shaft 14 can be achieved. In the event of a high differential speed, the stroke h changes quickly, and in the event of a low differential speed the stroke h changes slowly. However, the stroke h always changes in the event of a speed differential, which leads to an angular position differential of the two servomotors 12, 13. This preferably presupposes that the speeds of the servomotors 12, 13 translate in the same way into the speeds of the inner and outer shaft 14, 18. The variation of the stroke h is superimposed by the existing rotational movement of the crank pin 11 on the basis of the speed differential of the inner and outer shaft 14, 18, so that overall a helical movement of the crank pin 11 illustrated in FIG. 2 and thus a helical movement of the movable cutting die 6*b* is caused, which leads to a cut which places an increasing rotational load on the pipe wall.

Figure 3:
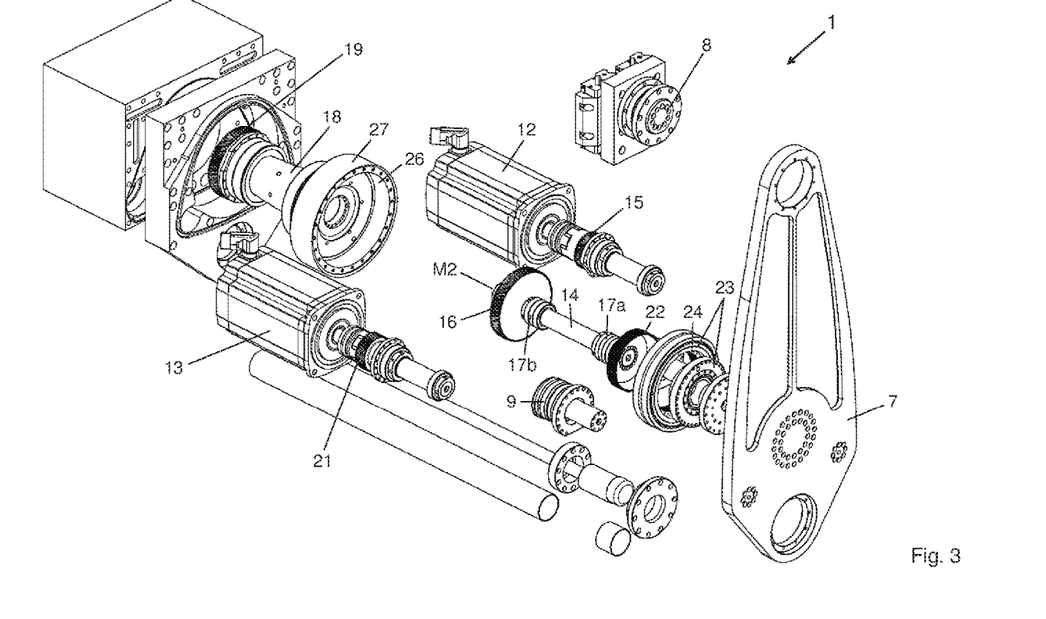
FIG. 3 shows an exploded view of the cutting device.

FIG. 3 shows a construction of the cutting device 1 of the pipe cutting machine in an exploded view, and in this case the references used in FIGS. 1 and 2 also appear in FIG. 3 with the same significance.

Figure 4:
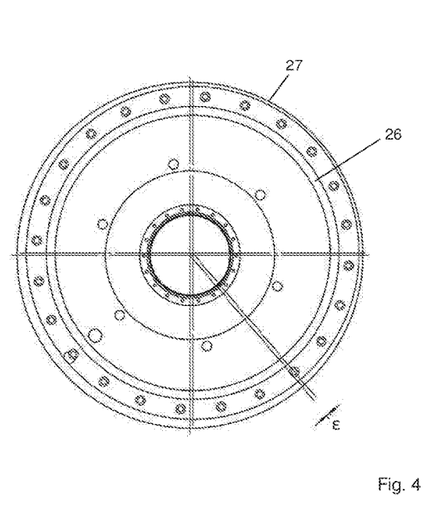
FIG. 4 shows an outer shaft in a front view.
Figure 5:
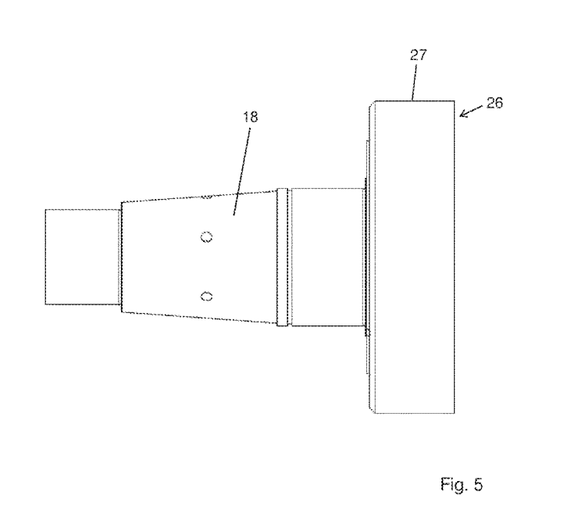
FIG. 5 shows the outer shaft in a side view.

However, the crank pin bearing 26 of the outer shaft 18 is formed eccentrically relative to the centre line M2 of the inner shaft 14. This is difficult to see in FIG. 3, but FIGS. 4 and 5 show the eccentricity ε of this arrangement, which is e=3 mm. In this case the eccentricity ε relates to the relative position of a circular inner bore, which is, however, concentric with the crank pin bearing 26, relative to the circular outer periphery 27 of the outer shaft 18. FIG. 5 shows the outer shaft 18 in a side view, wherein the eccentricity ε cannot be recognised.

The outer shaft 18 is driven by means of the second drive gear 19 which is driven by the second pinion 21 on the second servomotor 13. The inner shaft 14, which is supported in the two inner bearings 17a, 17b internally in the outer shaft 18, is passed through the outer shaft 18; the first drive gear 16 is arranged adjacent to the second drive gear 19; this is illustrated in FIG. 1 and the first servomotor 12 drives the first drive gear 16 of the inner shaft 14 with the first pinion 15. The inner shaft 14 is connected, in a fixed position and non-rotatably, to the gear 22 with external toothing on the inner shaft 14, the gear meshing with the internal toothing 24 of the crank pin drive 23. The crank pin drive 23 is shown without a crank pin 11, but it has a central opening 11' in which a pin 7' arranged fixedly on the drive lever 7 engages rotatably. The pivot bearing 8 is illustrated in the upper region of FIG. 3 and the axial guide 9 for the drive lever 7 is illustrated in the lower region.

Figure 6:
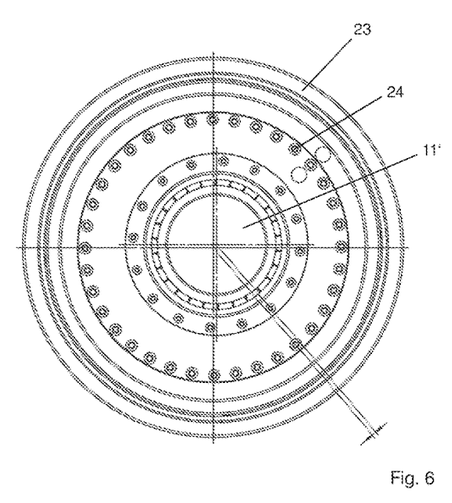
FIG. 6 shows a crank pin drive in a front view.
Figure 7:
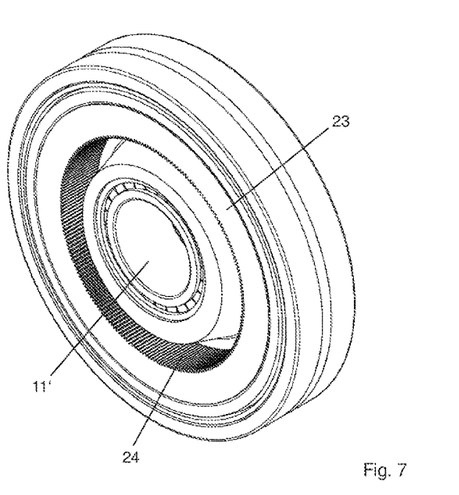
FIG. 7 shows the crank pin drive in a side view.

The crank pin drive 23 in turn can be seen in FIGS. 6 and 7. In this case it can be seen in FIG. 6 that the outer periphery of the crank pin drive 23 in FIG. 6, which rests in a fixed position in the crank pin bearing 26 of the outer shaft 18 according to FIGS. 4 and 5, is formed eccentrically with respect to the centre point of the circular central opening 11', which corresponds in its function to the crank pin 11. In other words, a rotary movement of the central opening 11' leads to an eccentric movement or a circular movement around the centre point of the outer periphery of the crank pin drive 23. The opening 11' is non-rotatably connected to the internal toothing 24 according to FIG. 7, in which the gear 22 according to FIG. 3 engages.

The mode of operation corresponds to the mode of operation illustrated in FIGS. 1 and 2.

Figure 8:
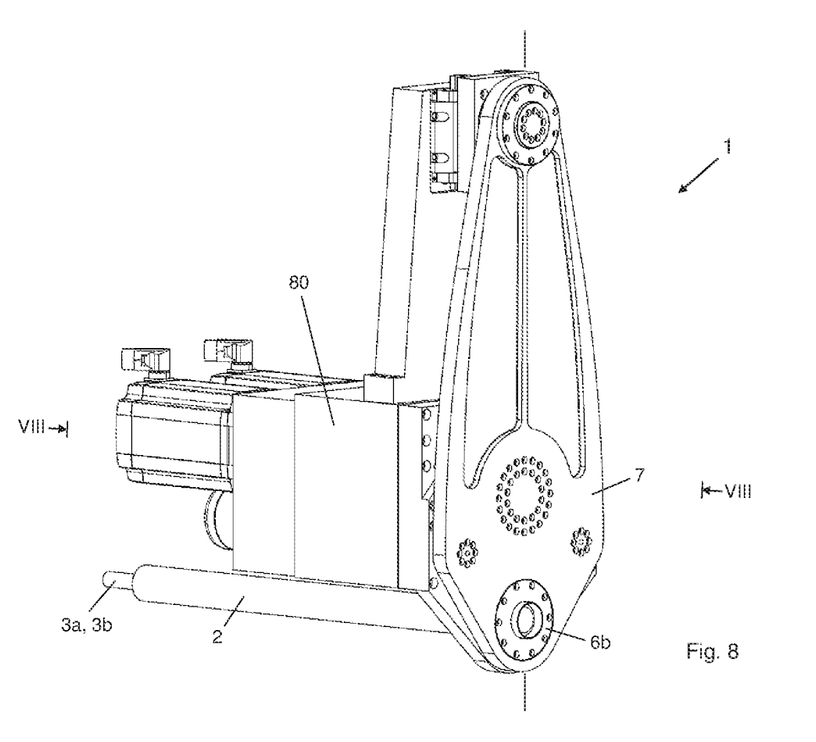
FIG. 8 shows the cutting device of the pipe cutting machine according to the invention in a perspective view.
Figure 9:
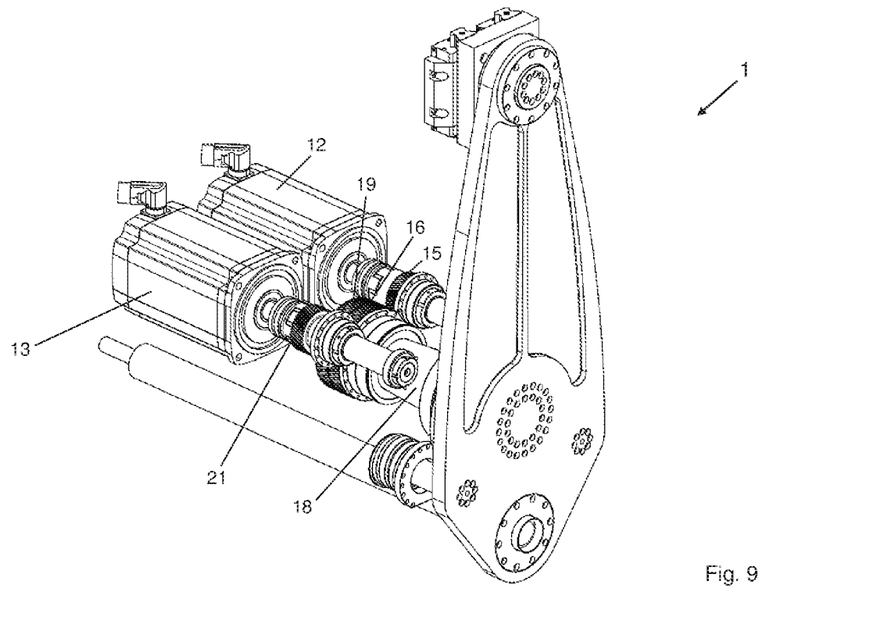
FIG. 9 shows the cutting device with the cover removed.
Figure 10:
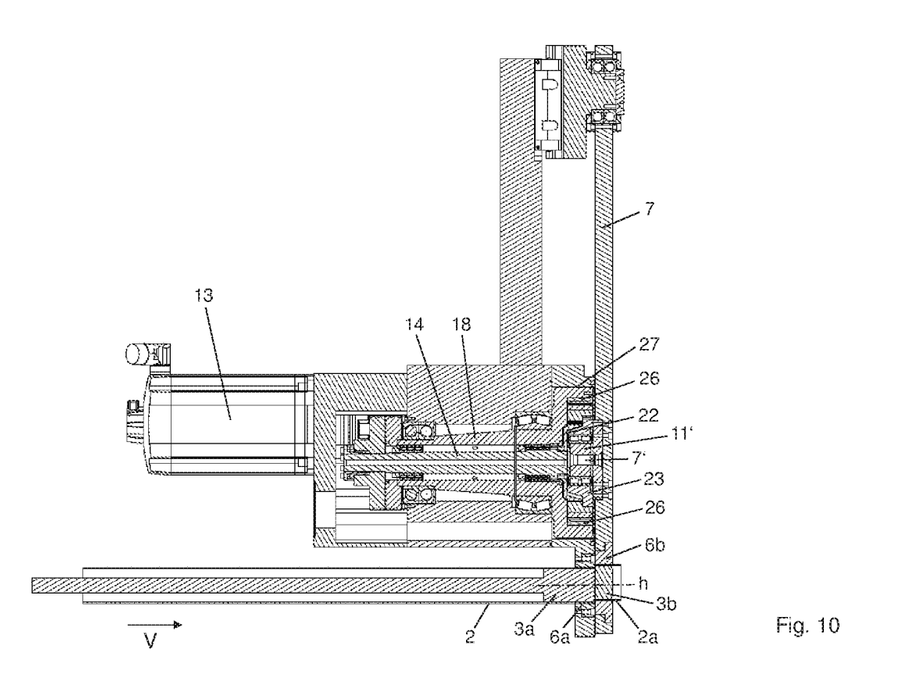
FIG. 10 shows a sectional view of the cutting device in FIG. 8 along the line VIII-VIII.

The cutting device 1 of FIG. 3 is illustrated in the assembled arrangement in FIGS. 8, 9 and 10.

FIG. 8 shows the cutting device 1 with a housing 80, the drive lever 7 is arranged movably with respect to the cutting device 1, and at the bottom the pipe 2 is illustrated, which is already inserted through the stationary and the drivable cutting dies 6a, 6b, and the cutting mandrel 3a, 3b is inserted in the pipe 2.

FIG. 9 shows the cutting device 1 with the housing 80 removed, and in this case it can be seen that the first and the second servomotor 12, 13 with their pinions 15, 21 engage in output gear wheels 16, 19 of the inner and outer shaft 14, 18 and drive them.

FIG. 10 shows the cutting device 1 in a lateral sectional view, and the components illustrated in FIGS. 1, 2 and 3 with their functions are accordingly illustrated in FIG. 10. Reference is made the description relating to FIGS. 1, 2 and 3 with regard to the mode of operation. FIG. 10 shows the drivable cutting die 6b having a stroke h, a pipe section 2a is already cut off from the pipe 2, and the drivable cutting die 6b is brought into a zero stroke position for a subsequent cut.

In the zero stroke position both servomotors 12, 13 rotate with the same rotational speed. Then a speed differential is set, so that the angular position of the two servomotors 12, 13 relative to one another changes. A predetermined speed differential can be set, which is maintained. The stroke h varies on the basis of the speed differential and the cutting dies 6a, 6b cut off a section from the pipe 2. The pipe 2 is then advanced some way in the pushing direction V, so that the cut-off pipe section 2a falls off and the subsequent cutting operation can be carried out.

LIST OF REFERENCES 1 cutting device
2 pipe
2a pipe section
3a stationary cutting mandrel
3b movable cutting mandrel
4 gap
6a stationary cutting mandrel
6b drivable cutting mandrel
7 drive lever
7' pin
8 pivot bearing
9 axial guide
11 crank pin
11' central opening
12 servomotor
13 servomotor
14 inner shaft
15 first pinion
16 first drive gear
17a inner bearing
17b inner bearing
18 outer shaft
19 second drive gear
21 second pinion
22 gear with external toothing
23 crank pin drive
24 internal toothing
26 crank pin bearing
27 outer periphery
80 housing
ε eccentricity
h stroke
M1 cutting mandrel central axis
M2 centre line of the inner shaft and the outer shaft
M3 centre line of the crank pin drive
V pushing direction

What is claimed is:

1. A cutting device comprising:
    a hole shaped movable cutting die (6b), which is driven by a drive lever (7) capable of performing circular movements with a continuously variable stroke (h) crank pin bearing (26) shaped eccentrically with respect to an outer shaft (18), in which a crank pin (11), which is arranged eccentrically on a crank pin drive (23), is movably supported in relation to the outer shaft (18), the crank pin (11) being in operative connection with the drive lever (7);
    wherein the crank pin drive (23) has an internal toothing (24) and the internal toothing (24) meshes with an external toothing (22) of an inner shaft (14); and
    wherein the inner shaft (14) is passed through a tubular section of the outer shaft (18).

2. The cutting device according to claim 1, characterised in that a centre line (M3) of the crank pin drive (23) and a centre line (M2) of the outer shaft (18) and a centre line (M2) of an inner shaft (14) are arranged parallel to one another.

3. The cutting device according to claim 1, characterised in that a centre line (M3) of the crank pin drive (23) and a centre line (M2) of the outer shaft (18) are arranged eccentrically relative to one another in any possible relative position of the crank pin drive (23) and the outer shaft (18).

4. The cutting device according to claim 1, characterised in that the crank pin (11) of the crank pin drive (23) and a centre line (M2) of the outer shaft (18) lie on one another in a zero stroke position.

5. The cutting device according to claim 1, characterised in that an inner shaft (14) is driven by a first servomotor (12) and the outer shaft (18) is driven by a second servomotor (13).

6. The cutting device according to claim 1, characterised in that a variable-stroke circular movement of the crank pin (11) can be set by a speed differential of first and second servomotors (12, 13).

7. The cutting device according to claim 1, characterised by a cutting mandrel (3a, 3b) which can be introduced into the pipe (2) and the cutting mandrel (3a, 3b) comprises a section (3a) which is stationary relative to the cutting device (1) and a section (3b) which is movable relative thereto.

8. A method for cutting off a profiled section from a longitudinal profiled section (2) utilizing the cutting device of claim 1, wherein: a cutting die (6a, 6b) of the cutting device (1) is set to a zero stroke position, a longitudinal profiled section (2) is placed in the cutting die (6a, 6b), the inner shaft (14) and the outer shaft (18) are operated at the same rotational speed, a speed differential of the inner shaft (14) and of the outer shaft (18) is set and as a result a position of the crank pin (11) is rotated radially outwards out of a centre line (M2) of the inner shaft (14), the crank pin (11) drives the cutting die (6a, 6b) by means of the drive lever (7) to an outwardly rotated movement which cuts off the longitudinal profiled section (2) from the long profiled section (2a) in an outwardly rotated movement.

9. The method according to claim 8, characterised in that the speed differential is firmly set and as a result the path of the stroke (h) changes continuously and the crank pin (23) describes a spiral movement which drives the drivable cutting die (6b) to a spiral movement which cuts off a longitudinal profiled section (2a) from the long profile section (2a) in a spiral movement.

* * * * *